United States Patent [19]

Jones

[11] Patent Number: 4,479,288
[45] Date of Patent: Oct. 30, 1984

[54] CLAMP FOR TUBING

[75] Inventor: W. Richard Jones, Barrington, Ill.

[73] Assignee: Mercury Metal Products, Inc., Schaumburg, Ill.

[21] Appl. No.: 456,375

[22] Filed: Jan. 7, 1983

Related U.S. Application Data

[63] Continuation-in-part of Ser. No. 372,097, Apr. 26, 1982.

[51] Int. Cl.³ .......................... B65D 63/00; F16L 3/10
[52] U.S. Cl. ......................................... 24/277; 24/276; 24/278; 24/284; 285/424
[58] Field of Search .................. 24/277, 278, 276, 284, 24/285, 286; 285/382.2, 424; 248/74.7, 316.6

[56] References Cited

U.S. PATENT DOCUMENTS

| | | | |
|---|---|---|---|
| 1,205,132 | 11/1916 | Black | 285/424 |
| 2,215,318 | 9/1940 | Bristol | 285/424 |
| 3,729,782 | 5/1973 | Downing | 24/277 |
| 3,879,815 | 4/1975 | Dowling et al. | 24/277 |
| 3,955,250 | 5/1976 | Heckethorn | 24/277 |
| 4,015,313 | 4/1977 | Oldford | 24/277 |
| 4,056,869 | 11/1977 | Eisma, Jr. | 24/277 |
| 4,063,336 | 12/1977 | Jones et al. | 24/277 |
| 4,122,586 | 10/1978 | Nothdurft | 24/277 |
| 4,147,384 | 4/1979 | Heckethorn | 24/277 |
| 4,393,559 | 7/1983 | Heckethorn et al. | 24/277 |

Primary Examiner—Victor N. Sakran
Attorney, Agent, or Firm—Silverman, Cass & Singer, Ltd.

[57] ABSTRACT

A saddle or U-bolt clamp is formed from a unitary sheet metal stamping folded to provide hexagonal sleeve formations which receive the legs of the bolt in axially slidable relation. Torque transmitted to the ends of the sleeve formations as the securing nuts are drawn up on the legs of the bolt against the saddle will construct the saddle and U-bolt's bight around the telescoped tubing parts of the exhaust system of vehicles for which such a clamp commonly is used. The heavy duty use for which such clamp is required is permitted even in those critical applications where the transverse profile of the clamp must be substantially reduced or restricted without loss of efficacy and strength of the clamp.

7 Claims, 5 Drawing Figures

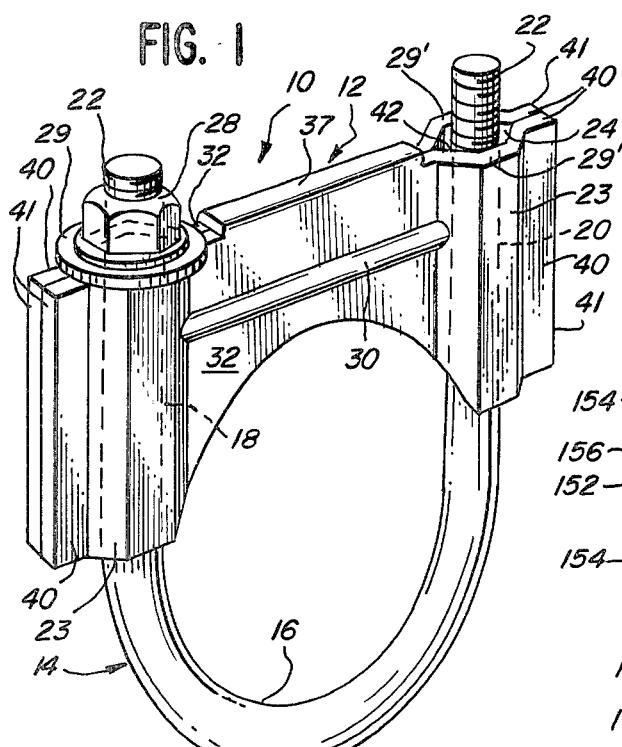
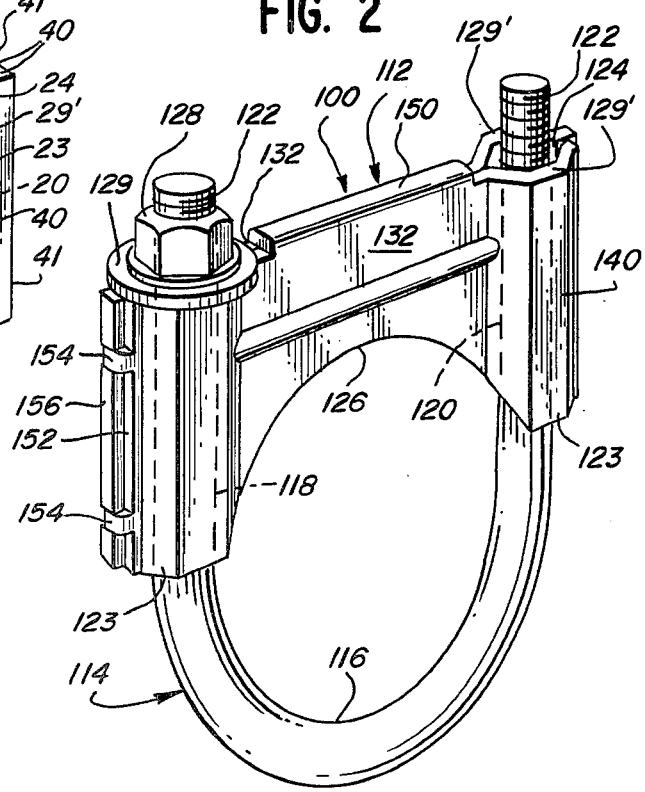
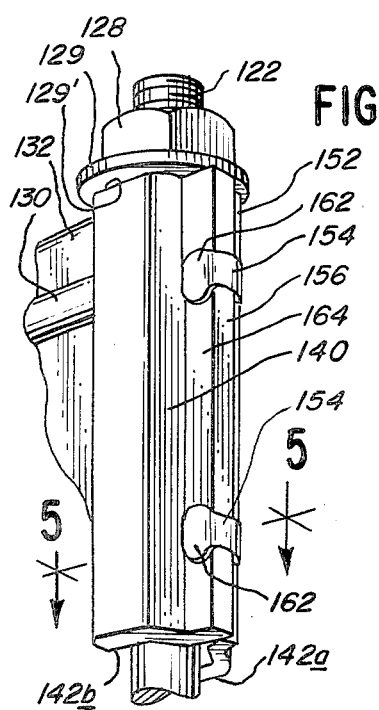
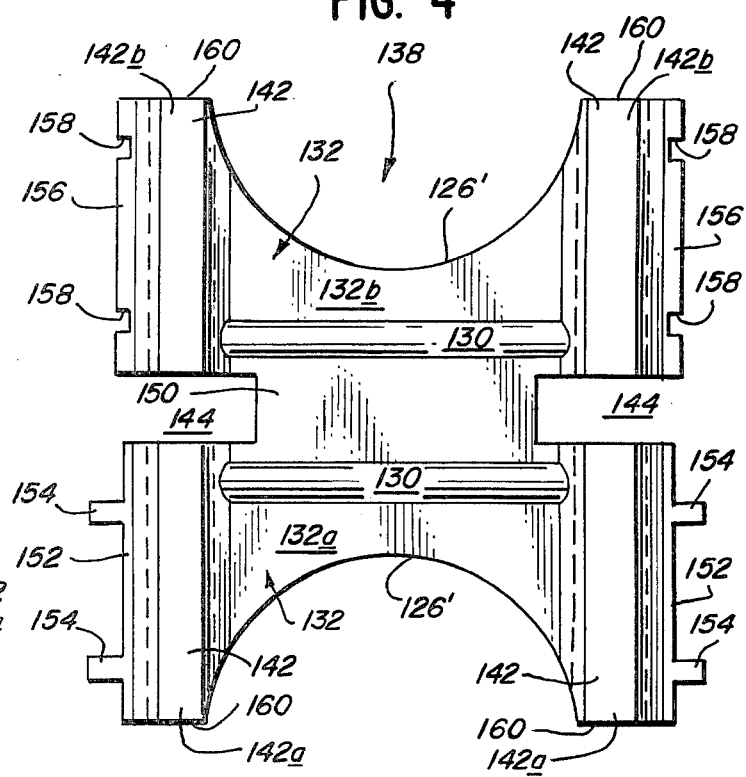
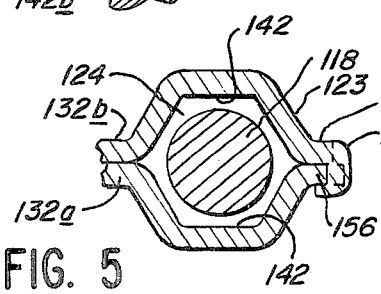

CLAMP FOR TUBING

RELATED APPLICATION

This is a continuation-in-part of application Ser. No. 6/372,097 filed Apr. 26, 1982 which is owned by the same assignee as this application.

BACKGROUND

This invention relates generally to the field of so-called U-bolt or saddle clamps for clamping telescoped sections of pipe or tubing of exhaust systems of internal combustion engines. By its nature, such clamp is used to achieve an emission-free joint between the telescoping tubing and is to be characterized as a heavy-duty clamp which necks the tubing in a crimping action which practically assures a complete seal.

My referenced parent application discloses a clamp saddle formed originally from a substantially flat sheet metal stamping which features a pair of opposite, identical mirror image parts connected by a transverse central segment. Each mirror part has a semi-circular cutout along an end edge opposite the central segment; each such part also has a pair of grooves parallel one relative to the other and extending normal to said central segment. The saddle is formed by folding the stamping transversely along the central segment so as to bring the mirror parts into substantially face-to-face juxtaposition and join each groove of one part with a groove of a facing part into a sleeve formation open at opposite ends thereof for receiving the legs of a U-bolt in axially slidable relation. Torque is transmitted to the ends of the sleeve formations by drawing up on nuts threaded on ends of the bolt legs for clamping the bight of the U-bolt and arcuate edges of the cutouts of the saddle around the telescoped tubing.

The U-bolt or saddle clamp of the referenced application is designated generally by the reference character 10. In plan view, the clamp 10 can be seen to have a substantial profile, i.e., it is very wide between the opposite exterior edges of the passageways 24 through which the legs 18, 20 are axially slidable. This is due to the relatively wide flanges which extend laterally beyond the trapezoidal grooves 42 seen in FIG. 6 and which abut and protrude beyond each passageway 24 of the clamp as seen in FIG. 2 of the referenced patent application. Clamps of the configuration illustrated in the referenced application have been marketed with dimensions in their bight ranging from 1.5 to 5.0 inches. Such clamps may be constructed of 13 gauge (0.090 inch) high form 50—50 KSI minimum tensile strength steel strip material. Welding or other fastening means for retaining the saddle in assembly are avoided as a desirable feature of production of the clamp. The wide flanges also assist in preventing distortion of the clamp when it is tightened because of their relatively large surface abutment.

One disadvantage of the saddle clamp of the referenced patent application is attributable to its profile or lateral dimension from side edge to side edge of the hexagonal passageways for the bolt legs. There are special physical environments for installing such a saddle clamp which dictate a reduced profile for the clamp without reduction in the clamping strength required for the clamp. The herein invention provides an improved saddle or U-bolt clamp which utilizes all of the salient structural advantages of the clamp of my parent application and yet, which enables a smaller profile clamp to be achieved without sacrificing any of those salient structural advantages. This is accomplished by substantial reduction in the width of the flanges of the clamp 10 without resorting to use of welding to retain the structural integrity of the passageways for the U-bolt shanks.

SUMMARY OF THE INVENTION

A U-bolt or saddle clamp is formed from a flat, generally rectangular sheet metal stamping folded upon itself along a transverse central segment to provide a pair of mirror image parts abutting in a face-to-face juxtaposition. The mirror image parts are configured in their original flat condition to include respective arcuate edges which will cooperate to provide the arcuate bight edges of the saddle; also, they include a pair of trapezoidal shaped grooves at opposed ends of the saddle which are mated to provide a pair of oppositely opening sleeve formations in the clamp. The bolt legs are received slidable axially in the sleeve and nuts are engaged on the bolt legs which can be drawn up to exert a torque against ends of the sleeve formations for tightening the clamp on telescoped tubing of an exhaust system of a vehicle. The sleeve formations are distinctive in that they contribute a desirably reduced profile or width for the clamp without sacrificing advantages engendered by the other structural features common with the clamp disclosed in the referenced patent application.

The reduced profile for the clamp of the herein invention is achieved by substantially reducing the width of laterally protruding flanges on the sleeve formations and still preventing deformation or distortion of the sleeve formations during application of torque forces thereagainst in the tightening of the clamp. Instead, the sleeve formations are retained in assembly by means of spaced tab or tongue members staked or swaged thereon, thus avoiding recourse to welding in the production of the clamp.

DESCRIPTION OF THE DRAWINGS

FIG. 1 is a perspective view of the clamp of my parent application;

FIG. 2 is a perspective view of a preferred embodiment of the present invention;

FIG. 3 is a fragmentary perspective view enlarged to show details of a sleeve formation of this clamp invention;

FIG. 4 is a plan view of the blank from which the saddle of this clamp invention is formed; and FIG. 5 is a sectional view taken along the line 5—5 of FIG. 3 and in the direction indicated generally.

DETAILED DESCRIPTION

The clamp designated generally by the reference character 10 illustrates the U-bolt or saddle clamp disclosed in the referenced application. Clamp 10 includes a saddle 12 and U-bolt 14 which provides an arcuate bight 16 and a pair of generally parallel shank parts 18, 20 having threaded ends 22. Saddle 12 has a pair of generally parallel, hollow formations 23 providing passageways 24 therethrough which are open at opposite ends thereof. Each of the shank parts 18, 20 is received in a passageway 24 for axial slidable movement therein. Each threaded end 22 is engaged by a nut, such as 28 shown in FIG. 1, which cooperates with washer 29 for applying torque against the engaged ends 29' of sleeve formations 23 when nuts 28 are drawn up. Upon such tightening of clamp 10, bight 16 of the U-bolt 14 and opposing semi-circular edge 26 of the saddle 12 cooperate to engage conventionally telescoping tubing of the exhaust system of a vehicle (not shown) for clamping them together.

Saddle 12 of clamp 10 preferably is formed from a unitary blank of sheet metal which has a pair of mirror image parts 32 connected by a narrow, elongate central segment 37. The hollow formations 23 are formed from a pair of mating, trapezoidal grooves 42 in the parts 32 when said parts 32 are folded into face-to-face juxtaposition seen in FIG. 1. In the assembled condition of clamp 10, hollow formations are generally hexagonal in cross-section and dimensioned to permit axially slidable movement of the shanks 18, 20 received therein.

As further seen in FIG. 1, hollow formations 23 each have a pair of laterally protruding flanges 40 integral therewith which abut in face-to-face engagement. Flanges 40 are coextensive in length with the formation 23 and have an identical width which is about one-half the width of a passageway 24. In other words, it can be readily seen that the laterally protruding relatively wide flanges 40 along opposite sides of the saddle 12 increases the profile or span of the saddle between the free edges 41 of said flanges 40. As explained in the referenced application, these flanges 40 are not welded or mechanically fastened together and do abut along their facing surfaces.

A salient feature of the present invention is to provide a saddle which substantially reduces the width of such flanges 40 to a degree of practical elimination thereof without sacrificing any of the advantages of the clamp 10. The clamp of the present invention is designated generally by the reference character 100 in FIG. 2. Since clamp 100 is identical in most respects to the clamp 10 of FIG. 1, the same reference characters used to identify parts of clamp 10 will be used to identify identical or similar parts of clamp 100, but with the addition of the numeral value of 100.

Clamp 100 has a saddle 112 and a U-bolt 114 provided with a generally semi-circular bight 116 connecting a pair of generally parallel shank parts 118, 120 each having a threaded end 122. A nut, such as 128, and a washer, such as 129, will be engaged on each of said ends 122, although only one such installation is illustrated in FIG. 2.

Saddle 112 has a pair of elongated, hollow formations 123 which provide passageways 124 in which shank parts 118 and 120 are received for axial slidable movement. Saddle 112 also has a semicircular edge 126 which faces the bight 116 for clamping a pair of telescoping tubes together (not shown) when the nuts 128 are drawn up to apply torque against the upper ends 129' of hollow formations 123.

Referring to FIG. 4, the sheet metal stamping from which saddle 112 is formed is designated generally 138. Member 138 may be constructed of suitable gauge steel strip metal, such as, 13 gauge (0.09'), high form 50—50 SKI minimum tensile strength. Member 138 provides a pair of mirror image parts 132 connected along a medial or central segment 150. Each part 132 has a semicircular cutout portion 126' which provides the pressure applying edge 126 in the assembled saddle 120. Contiguous the extremities of each cutout portion 126 is a trapezoidal groove 142 which extends between the ends of the member 138 and normal to the medial segment 150.

Member 138 has rectangular cutout portions 144 separating the trapezoidal grooves 142 between the mirror parts 132. Strengthening ribs 130 are formed in member 138 parallel one to the other and equally spaced from the segment 150.

The salient feature of the present clamp invention is the practical elimination of the flanges 40 of clamp 10. As seen in FIG. 4, the trapezoidal grooves 142a of mirror part 132a each have a very narrow lateral wing or flange 152 and a pair of spaced apart tabs or tongues 154 protruding laterally outward therefrom. The other mirror part 132b also has narrow wings 156 extending outwardly from the associated trapezoidal grooves 142b which are slightly wider than the wings 152. However, each wing 156 has a pair of spaced apart notches 158 therein which are spaced apart a distance equal to the spacing between the tabs or tongues 154 on a wing 152.

In assembling the saddle 112, blank 138 is folded along the medial or central part 150 so that the mirror parts 132a and 132b are brought into substantial face-to-face juxtaposition seen in FIG. 2. In this configuration, the trapezoidal grooves 142a and 142b of the mirror parts confront one another to form the hexagonal passageways 124 in the sleeve formations 140. The edges 160 of the cutout portions 144 combine to provide the bearing edges 129' against which the nuts 128 are tightened. The tabs 154 are staked or swaged into the notches 158 and each extremity 162 of a tab 154 is flattened or enlarged to press against an outer surface 164 of a wing 156, as seen in FIG. 3 and FIG. 5. The staked tabs retain the thusly conjoined parts 142a and 142b against separation upon tightening of the clamp notwithstanding that the wings 152 and 150 are really very narrow.

It will be appreciated that the hexgonal shaped sleeve formations 140 serve to resist deformation of the saddle 112 when the nuts 128 are drawn up. Further, the staked tabs 154 serve to prevent said sleeve formations 140 from separating under the same condition of torque application for tightening the clamp 100 as encountered with clamp 10 of the referenced application. The central segment 150 at the top of the segment 112 serves also to retain the shape of the assembled saddle 112 during tightening of the clamp 100 when the nuts 128 are drawn up. The strengthening ribs 130 in the mirror parts 132 cooperate to provide a hollow cylindrical formation in the juxtaposed parts 132 further to resist deformation of the saddle during tightening of the clamp.

The profile or transverse dimension between the outer edges 166 of the sleeve formations 140 in a commercial embodiment of clamp 100 was approximately 3.5 inches. In a commercial embodiment of the blank 10, that same dimension was approximately 4.0 inches. This substantial reduction of ½ inch in profile of the clamp 100 was achieved without any reduction in the strength and efficacy of clamp 100 as compared with clamp 10. Yet, in certain applications, a clamp such as clamp 10 could not be utilized because of its unduly large profile dimension. Such instances where the clamp 100 was feasible in place of clamp 10 were with exhaust systems of small American-Model cars where the muffler was connected to the catalytic converter. Further, this approximate 0.5 inch spread in profile was carried over through the full range of 1.5 through 5.0 inch diameter clamps of this type.

Modifications in the dimensions and material specifications for the present clamp invention may occur to the skilled artisan without departing from the scope of the invention as defined in the appended claims.

I claim:

1. A U-bolt clamp saddle comprising: an originally, substantially flat sheet metal stamping of generally rectangular configuration having a transverse central segment forming said member into opposite, identical mirror parts, each mirror part having a semicircular cutout portion along its end edge opposite said segment, a rectangular notch in each of the side edges of the stamping aligned with and located at the ends of said segment whereby a portion of each notch enters both mirror parts, said stamping having two grooves formed therein, respectively parallel with and adjacent said opposite side edges, said grooves extending the entire length of the stamping between said end edges, each groove intersecting and being interrupted by a respective rectangular notch while said stamping is in the flat condition, said saddle being formed by reason of said member being folded upon itself along said segment and through said notches such that said mirror parts are in substantially face-to-face juxtaposition and each half groove mates with its opposite half to form a sleeve formation having a through-passageway adapted to receive the leg of a U-bolt, each notch forming bearing edges at ends of the respective passagesway, each sleeve formation having a narrow lateral wing with at least a pair of cooperatively interlocking notch and tongue means for preventing distortion or deformation thereof during tightening of the clamp, said tongue means being integral with and protruding beyond a side edge of one of the mirror parts and said notches being formed in the half groove of the second mirror part opening to a side edge thereof.

2. A clamp saddle as claimed in claim 1 in which said tongue means has an enlarged extremity bearing against a surface of said second mirror part.

3. A clamp saddle as claimed in claim 1 in which said tongue means are sufficiently long so as to permit their being bent over into a notch and into engagement with a surface of the second mirror part.

4. A clamp assembly comprising:
A. a clamp saddle formed from an originally, substantially flat sheet metal member comprising a stamping of generally rectangular configuration having a transverse central segment forming said member into opposite identical mirror parts, each mirror part having a semicircular cutout portion along its end edge opposite said segment, a rectangular notch in each of the side edges of the member aligned with and located at the ends of said segment whereby a portion of each notch enters both mirror parts, said member having two grooves formed therein, respectively parallel with and adjacent said opposite side edges, said grooves extending the entire length of the member between said end edges, each groove intersecting and being interrupted by a respective rectangular notch while said member is in the flat condition, said saddle being formed by reason of said member being folded upon itself along said segment and through said notches such that said mirror parts are in substantially face-to-face juxtaposed disposition and each half groove joins with its opposite half to form a sleeve formation providing an open-ended passageway adapted to receive the leg of a U-bolt, each notch forming bearing edges at the ends of the respective passageway;

B. a U-bolt with its arms passing through said respective passageways, each arm having a threaded end and a nut engaged on each threaded end, the bight of the bolt extending below said saddle opposite said semicircular cutout portions;

C. said clamp adapted to grip at least one tubular member between said bight and said semicircular shaped edges when said nuts are tightened against said saddle;

D. said sleeve formations having narrow lateral wings with cooperating interlockable tongue and notch means along the side edges of said mirror parts constructed and arranged to be interengaged to retain the sleeve formations in assembly when said nuts are tightened;

E. said tongue means being integral with and protruding beyond a side edge of one of the mirror parts;

F. said notches being formed in the half groove of the second mirror part opening to a side edge thereof.

5. A clamp assembly as claimed in claim 4 in which said tongue means are provided on the side edges of one of the mirror parts and the notches are provided in the side edges of the second mirror part.

6. A clamp assembly as claimed in claim 4 in which said tongue means has an enlarged extremity bearing against a surface of said second mirror part.

7. A clamp assembly as claimed in claim 4 in which said tongue means are sufficiently long so as to permit their being bent over into a notch and into engagement with a surface of the second mirror part.

* * * * *